Sept. 21, 1937. F. C. ROESSLER 2,093,620
COMBINATION LICENSE PLATE COVER AND ADVERTISING DEVICE
Filed Oct. 29, 1936
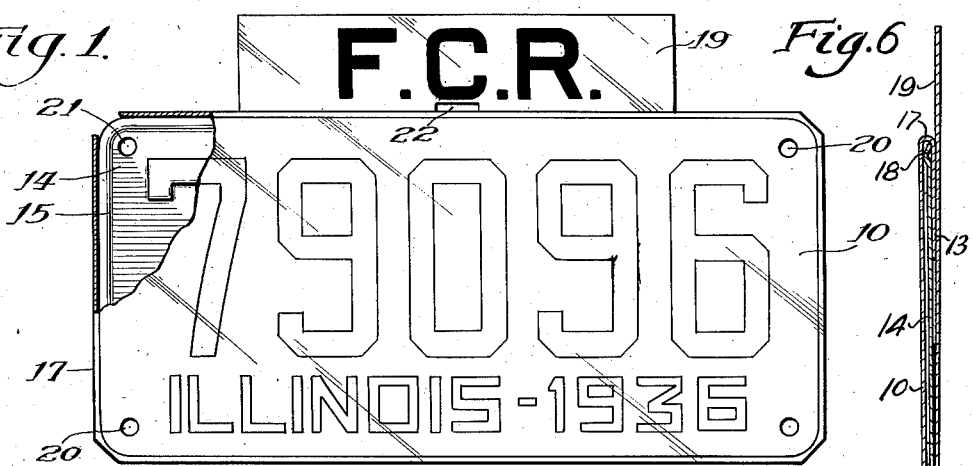
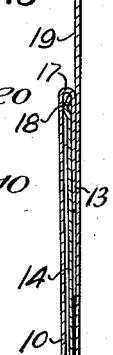
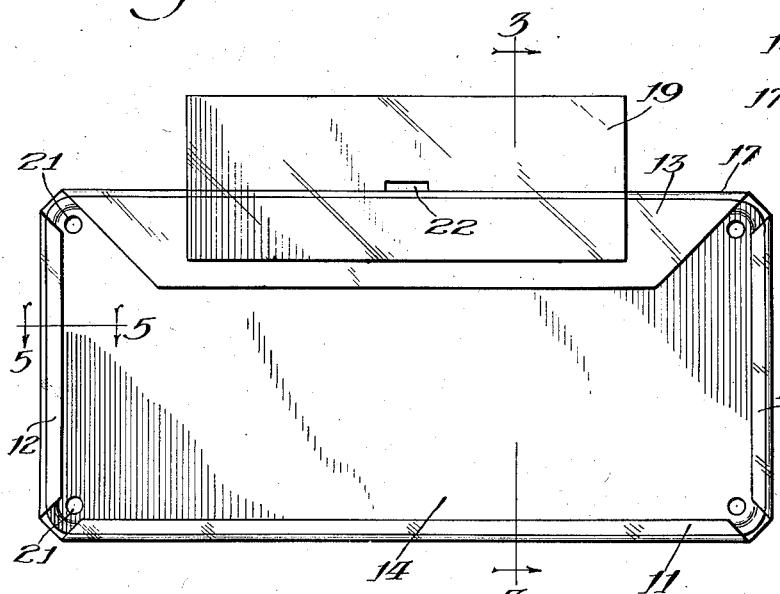
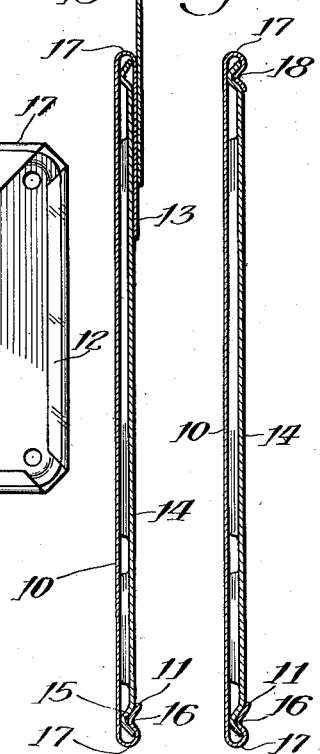
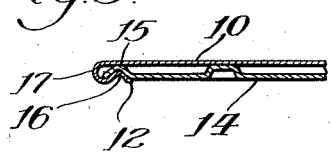
Inventor:
Fred C. Roessler,
By: Bertha L. MacGregor
Attorney Patented Sept. 21, 1937

2,093,620

UNITED STATES PATENT OFFICE 2,093,620

COMBINATION LICENSE PLATE COVER AND ADVERTISING DEVICE

Fred C. Roessler, Chicago, Ill.

Application October 29, 1936, Serial No. 108,151

7 Claims. (Cl. 40—125)

This invention relates to a combination automobile license plate cover and advertising device.

The main object of the invention is to provide a protective cover of transparent material, which may be easily and quickly applied to an automobile license plate, and which, preferably, is provided with means for carrying advertising matter.

Another object is to produce a cover of the character described, which is a unitary, self-contained device capable of being applied to a license plate without the aid of separate fastening devices.

The cover protects the license plate against moisture and dirt without obscuring the license numbers.

In the drawing:

Fig. 1 is a front elevation of an automobile license plate cover and advertising device embodying my invention, the cover being broken away and partly in section to show the license plate.

Fig. 2 is a rear view of the license plate and cover shown in Fig. 1 excepting that the license number and other matter appearing on the face of the plate has not been shown on the reverse side.

Fig. 3 is an enlarged vertical sectional view taken in the plane of the line 3—3 of Fig. 2.

Fig. 4 is a view similar to Fig. 3 showing a modified form of construction.

Fig. 5 is a fragmentary sectional view taken in the plane of the line 5—5 of Fig. 2.

Fig. 6 is a vertical sectional view, on a smaller scale, of a modified form of the construction shown in Fig. 3.

In that embodiment of my invention shown in the drawing, the cover comprises a rectangular front panel 10, a bottom flange 11, side flanges 12, 12, and a top flange 13, integrally formed and preferably made of celluloid or other suitable transparent material which has the flexibility and resilience of celluloid. The front panel 10 is preferably flat and lies closely adjacent to the raised letters on the face of the license plate 14 which, as shown, has a conventional rib 15 formed in the metal adjacent its edges. The flanges 11 and 12 preferably are complemental to the rear surface of the license plate 14 adjacent its edge, and in the embodiment herein shown, said flanges are provided with an inwardly directed rib 16 which engages the concave rear surface of the rib 15 of the plate 14. The flanges are joined to the front panel 10 by curved portions 17.

The upper flange may be identical with the flanges 11 and 12 heretofore described, as shown at 18 in Fig. 4, or it may be made wider as shown at 13 in Figs. 1 to 3. In the embodiment shown in Figs. 1 to 3, an advertising device 19 is secured to the flange 13 by any suitable means, as for example, by applying acetone to the proximate surfaces. The device 19 projects beyond the plate edge, preferably in an upward direction, and is intended to carry an advertisement, the car owner's initials or any other suitable matter. The form of the part 19 may be varied.

The flanges preferably will be formed so as to be complemental to the adjacent surface of the license plate, whether the plate is of the ribbed form herein described or other contour, but it should also be understood that a cover having plain or flat surfaced flanges will function satisfactorily and is comprehended within the scope of the invention.

The cover may be provided with slots or apertures 20 which register with apertures 21 in the plate 14 to accommodate the screws used to fasten the plate to the automobile. Some automobiles are provided with means for attaching the plate by screws at the bottom to a horizontal bar, the bar having a vertically disposed strap ending in a hook which engages the top of the plate. The strap extends upwardly in rear of the plate. For plates so mounted I provide a slot 22 in the advertising device 19, just above the upper edge of the cover, to accommodate the hook which engages the plate as described.

The celluloid blank of which the cover is made is bent at 17 in such manner that the flanges incline toward the front panel and when the cover is in place on a license plate, the flanges snugly engage the plate, and the cover is retained in position without the aid of fastening devices. Of course, the screws by which the plate is mounted on the automobile may extend through the cover if desired, to prevent theft.

The invention is not limited to flanges of exact form and size as shown. Obviously the flanges may be made wider so as to more fully protect the rear surface of the plate, if desired. It is also obvious, as shown in Fig. 6, that the lower flange 11 may extend upwardly adjacent the rear surface of the plate 14 and beyond the upper edge of the plate so as to provide the equivalent of the advertising device 19, which in the form shown in Fig. 3 is not integral with the flange 11 but is connected to the upper flange 13.

Changes may be made in details of construction without departing from the scope of my invention and I do not intend to be limited to the exact form shown and described, except as set forth in the appended claims.

I claim:—

1. A cover for an automobile license plate comprising a front panel of transparent material adapted to cover the face of the plate, and flanges at the edges of said panel, the material of which said cover is made being flexible and resilient and said flanges being inclined toward the front panel to yieldingly engage the rear of the plate.

2. A cover for an automobile license plate comprising a front panel of transparent material adapted to cover the face of the plate, and flanges at the edges of said panel, said flanges having inwardly directed ribs extending parallel to the adjacent edges of the panel and adapted to engage the rear surface of the plate.

3. In combination with an automobile license plate, a cover comprising a front panel of transparent material covering the face of the plate, and flanges at the edges of said panel, said flanges being complemental to the rear surface of the plate adjacent its edges and yieldingly engaging said plate.

4. In combination with an automobile license plate, a cover comprising a front panel of transparent material covering the face of the plate, flanges at the edges of said panel, said flanges snugly engaging the rear surface of the plate and retaining the cover in position without the aid of separate fastening devices, and an advertisement-carrying device connected to said cover and extending beyond one edge of the cover.

5. In combination with an automobile license plate, a cover comprising a front panel of transparent material covering the face of the plate, flanges at the edges of said panel, said flanges snugly engaging the rear surface of the plate and retaining the cover in position without the aid of separate fastening devices, and an advertisement-carrying device connected to the upper flange and extending beyond one edge of the cover.

6. In combination with an automobile license plate, a cover comprising a front panel of transparent material covering the face of the plate, flanges at the edges of said panel, said flanges snugly engaging the rear surface of the plate and retaining the cover in position without the aid of separate fastening devices, and an advertisement-carrying device connected to the upper flange and extending beyond one edge of the cover, said device being slotted adjacent to and parallel with the upper edge of the cover.

7. In combination with an automobile license plate, a cover comprising a front panel of transparent material covering the face of the plate, and means integral with said panel engaging the rear surface of the plate and retaining the cover in position without the aid of separate fastening devices, said means extending beyond the upper edge of the plate.

FRED C. ROESSLER.